Oct. 3, 1939.                    E. R. FISH                    2,174,783
                GEAR TOOTH CHAMFERING AND BURRING MACHINE
                    Filed Oct. 12, 1936          7 Sheets-Sheet 1
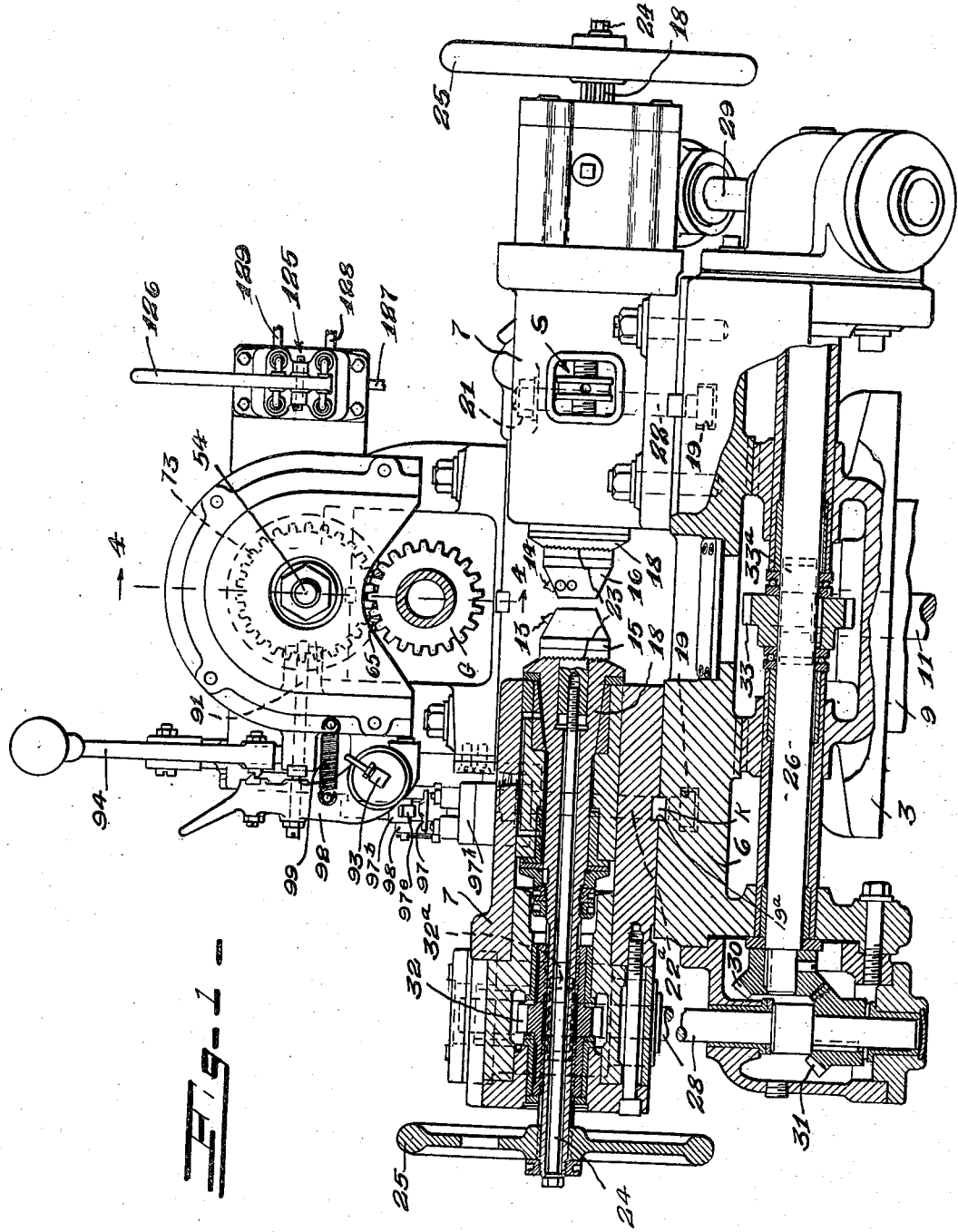
INVENTOR.
Earl R. Fish
BY Bodell & Thompson
ATTORNEYS.

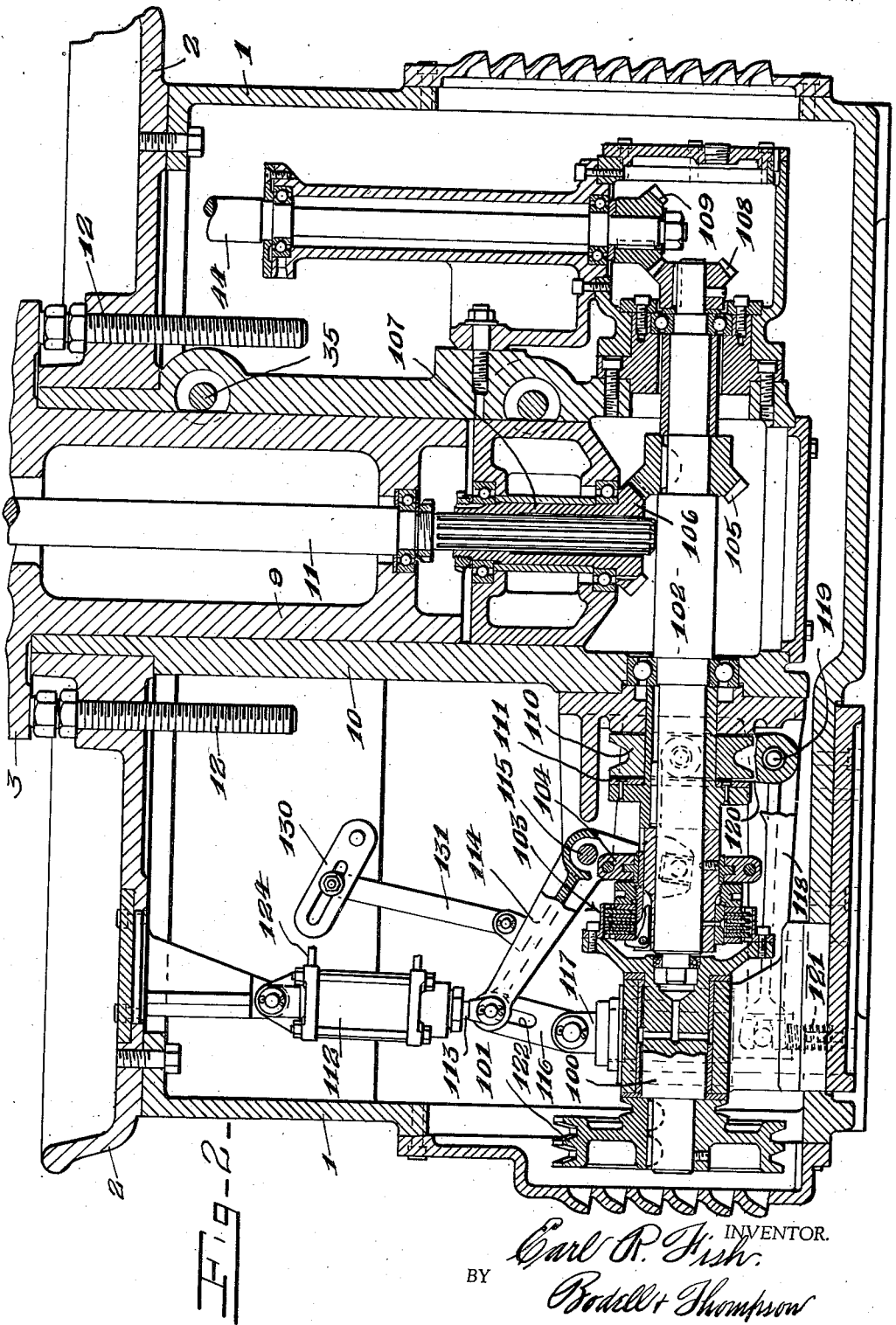

Oct. 3, 1939.  E. R. FISH  2,174,783
GEAR TOOTH CHAMFERING AND BURRING MACHINE
Filed Oct. 12, 1936   7 Sheets-Sheet 3
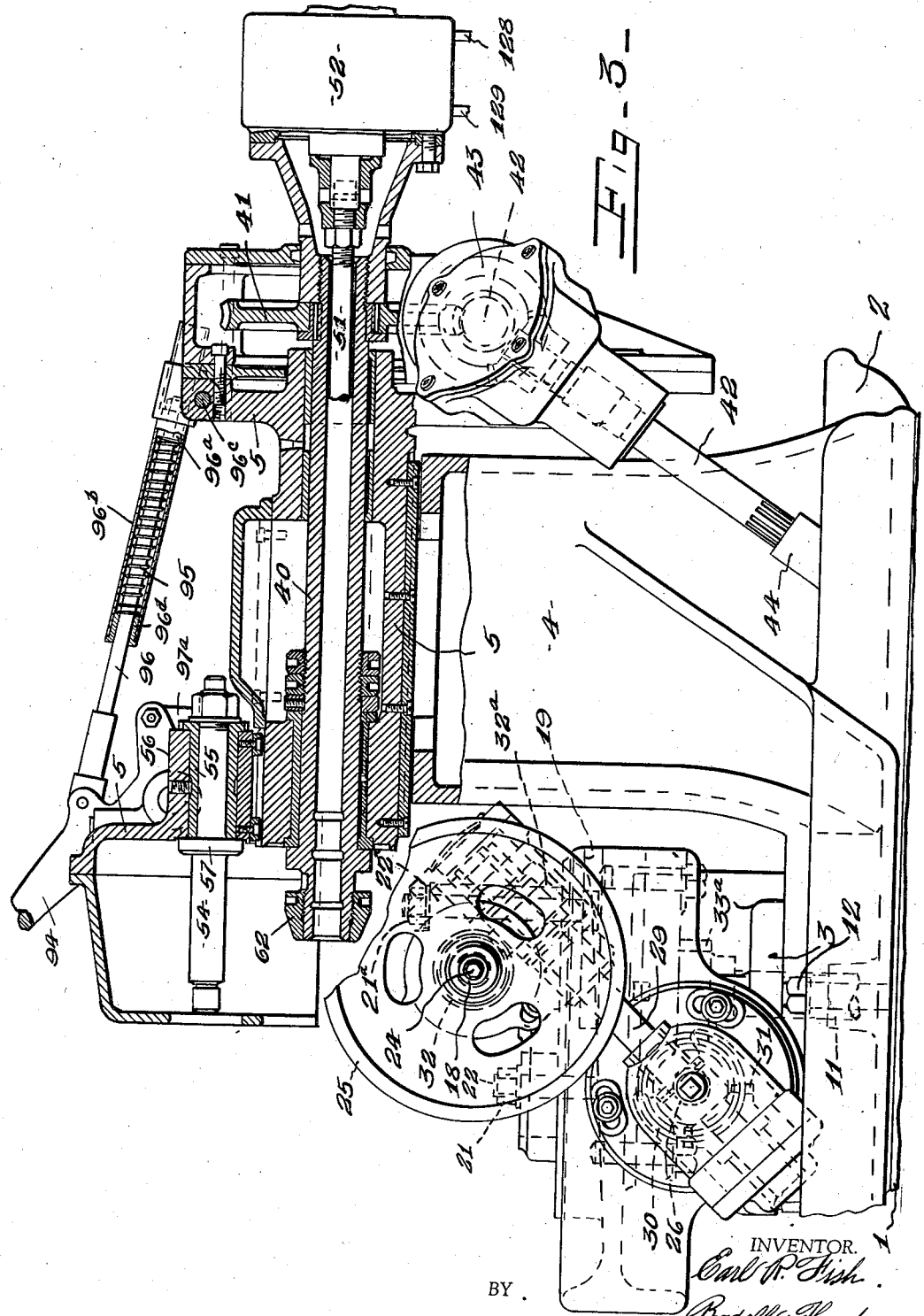
INVENTOR.
Earl R. Fish
BY
Bodell & Thompson
ATTORNEYS.

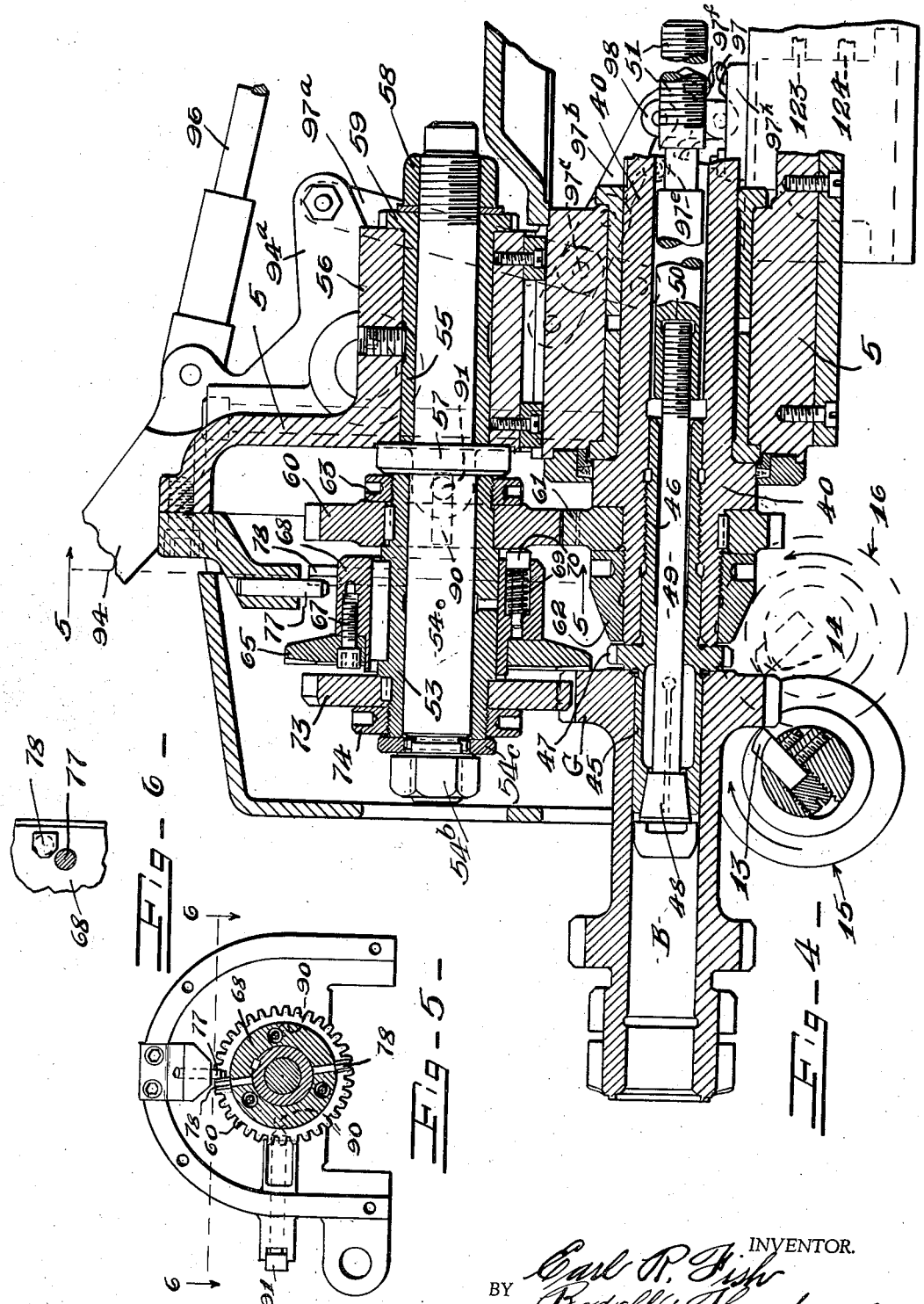

Oct. 3, 1939.  E. R. FISH  2,174,783
GEAR TOOTH CHAMFERING AND BURRING MACHINE
Filed Oct. 12, 1936   7 Sheets-Sheet 5
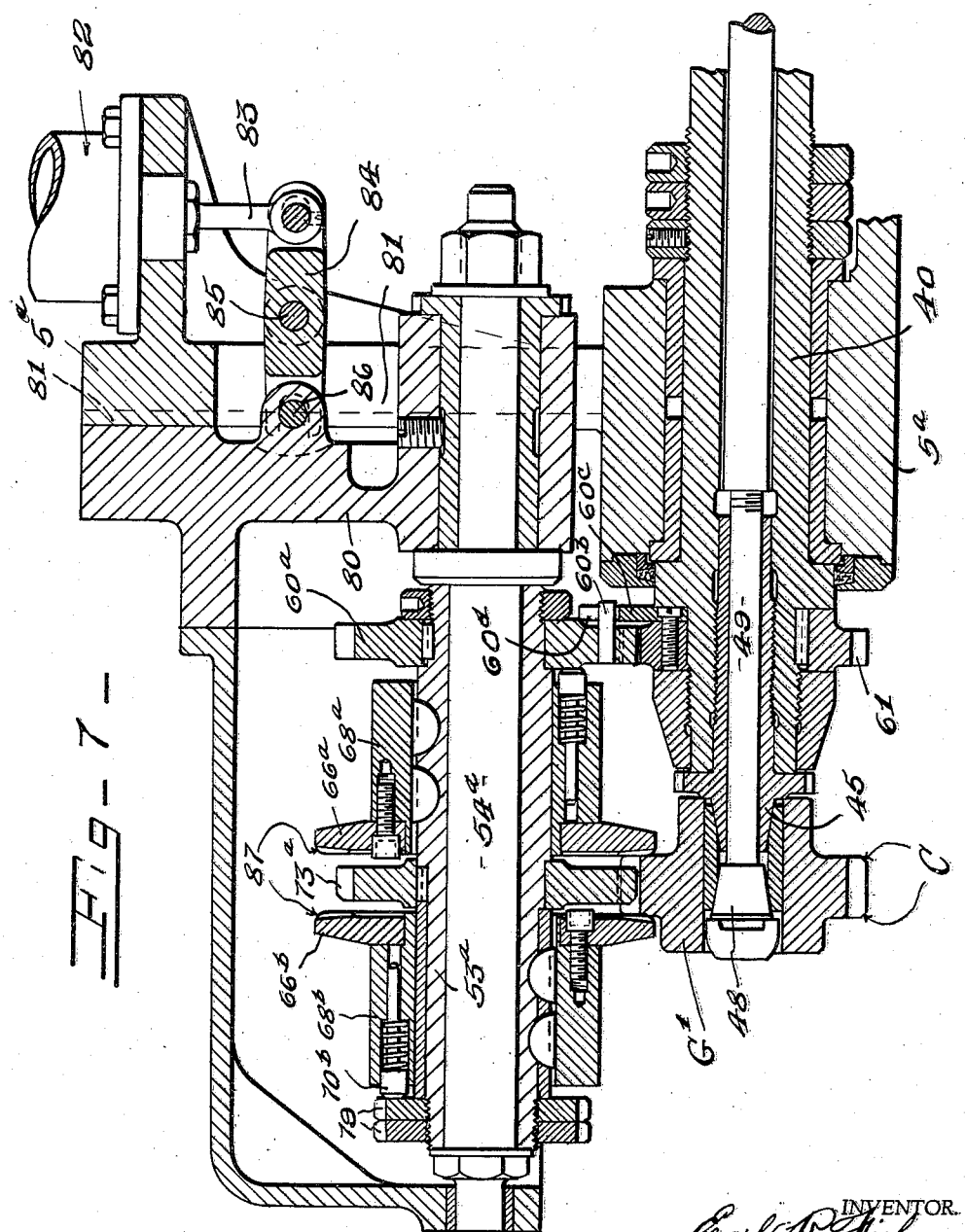

Oct. 3, 1939.  E. R. FISH  2,174,783
GEAR TOOTH CHAMFERING AND BURRING MACHINE
Filed Oct. 12, 1936   7 Sheets—Sheet 6
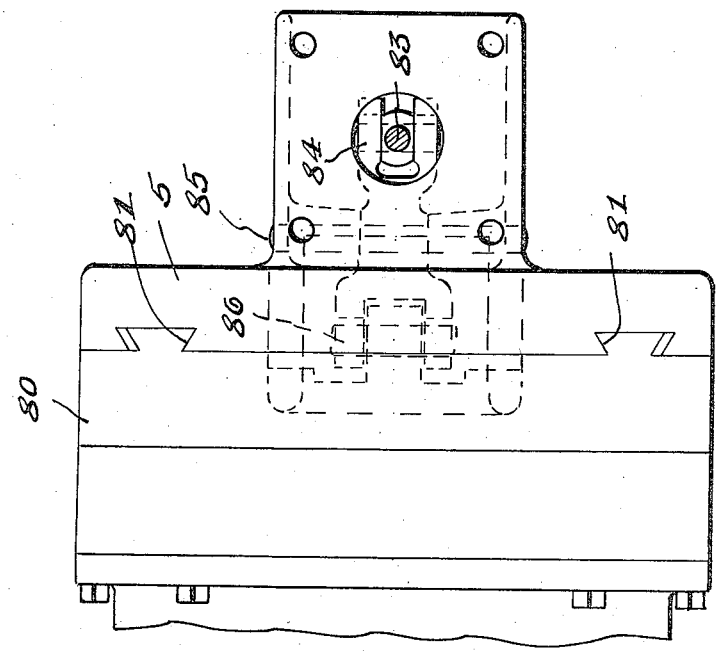
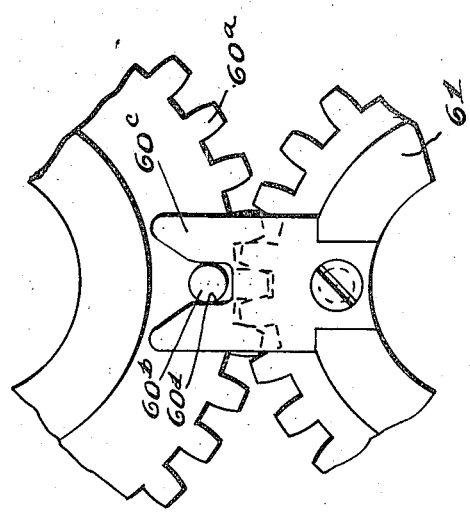
INVENTOR.
Earl R. Fish
BY Bodell & Thompson
ATTORNEYS.

Oct. 3, 1939.　　　　　　　　E. R. FISH　　　　　　2,174,783
GEAR TOOTH CHAMFERING AND BURRING MACHINE
Filed Oct. 12, 1936　　　7 Sheets-Sheet 7
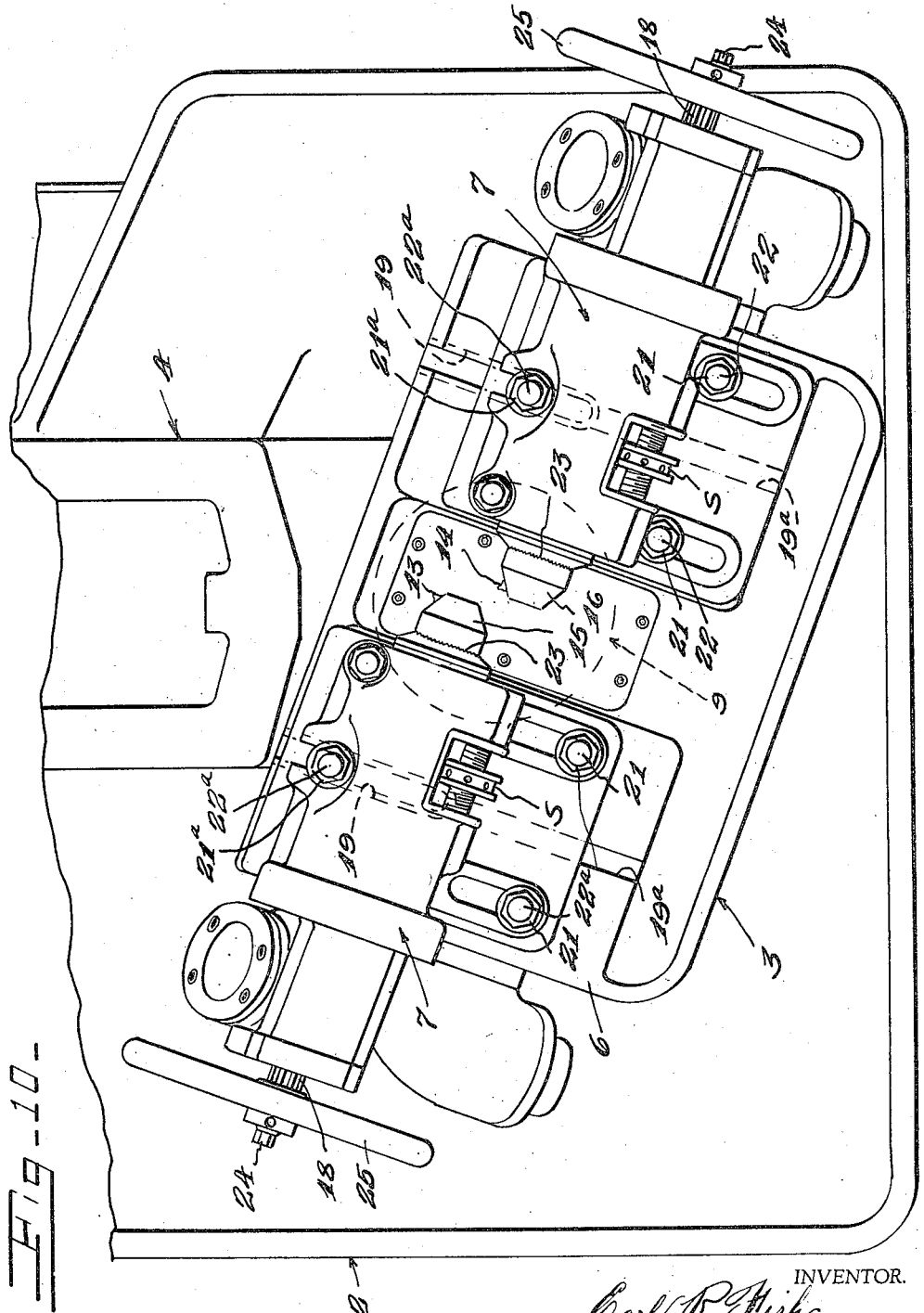
INVENTOR.
Carl R. Fish
BY Bodell & Thompson
ATTORNEYS.

Patented Oct. 3, 1939

2,174,783

UNITED STATES PATENT OFFICE 2,174,783

GEAR TOOTH CHAMFERING AND BURRING MACHINE

Earl R. Fish, Syracuse, N. Y., assignor to W. C. Lipe Inc., Syracuse, N. Y., a corporation of New York Application October 12, 1936, Serial No. 105,256

5 Claims. (Cl. 90—1)

This invention relates to what for convenience might be called a gear finishing machine or a gear tooth finishing machine and more particularly to a machine for finishing the ends of the gear teeth by chamfering the corners at the ends of the gear teeth, and it further has for its object a gear tooth chamfering machine or finishing machine for chamfering the corners, and more especially the acute angle corners at the ends of the spiral gear teeth, and removing burrs that may be left after the chamfering operation or any previous one, as the hobbing operation.

It further has for its object a gear tooth chamfering and burr removing machine in which the chamfering and burr removing operations are performed during the same work cycle period and effected by a chamfering cutter or cutters and a burr cutter or cutters rotatable in a certain synchronism with the work gear, and also an idle or locating gear meshing with the work gear and rotatable with the burr cutter or cutters.

It further has for its object a chamfering and burr removing machine in which the burr cutter or cutters and the work gear holder have a relative shifting movement to separate them to permit the loading and unloading of the work gear support, that is, permit removal of a finished gear from a machine and the placing of an unfinished gear on the work gear support.

It also has for its object a machine in which the burr cutters are spring-pressed against the work, and also preferably for withdrawing the burr cutter against its spring means at the end of the work cycle.

It further has for its object means by which the machine is automatically stopped at the end of each work cycle.

It also has for its object an adjustment of the chamfering tool holder carriages for different sizes of work gears, and also means by which an adjustment of the chamfering tool holders may be effected for gears of different axial widths, and for various angles of the spiral gear teeth.

Other objects will appear throughout the specification.

The invention consists in the novel features and in the combinations and constructions hereinafter set forth and claimed.

In describing this invention, reference is had to the accompanying drawings in which like characters designate corresponding parts in all the views.

Figure 1 is a side elevation, partly in section, of the upper portion of the machine, and Figure 2 is a sectional view through the lower portion or base of the machine; Figures 1 and 2 taken together showing the entire machine in vertical section.

Figure 3 is an enlarged fragmentary sectional view taken approximately on the plane of line 4—4, Figure 1, some parts shown in Figure 4 being omitted, and also additional parts not shown in Figure 4 being included.

Figure 4 is a sectional view on the plane of line 4—4, Figure 1.

Figures 5 and 6 are fragmentary detail sectional views of parts of the cam mechanism shown in Figure 4, Figure 5 being a sectional view taken on the plane of line 5—5, Figure 4, and Figure 6 being an enlarged view taken on line 6—6, Figure 5.

Figure 7 is a fragmentary view, similar to Figure 5, showing a pair of burr cutters for finishing opposite sides of the gear at the same time and mechanism for moving the burr cutter mechanism radially relatively to the work gear to separate the burr cutter from the work gear to make the work gear accessible for removal and for the replacement of a new gear to be finished on the work gear holder.

Figure 8 is a detail view of the locating mechanism for initially locating the work gear.

Figure 9 is a plan view of parts seen in Figure 7, the air cylinder being removed.

Figure 10 is a plan view of the chamfering tool mechanism showing the relative position of the tool and cross adjustable carriages therefor.

This gear finishing machine comprises, generally, a suitable frame, a rotatable support for the work gear, a rotatable burr cutter support, a rotatable chamfering tool support, means for rotating the supports simultaneously or synchronously, and means for controlling the actuation of the supports and the cutters.

The frame of the machine comprises a base 1 (Figure 2) having a table 2 at its top, a carriage 3 mounted on the base for supporting the chamfering tool mechanism, and a bracket or bolster 4 (Figure 3) on the top of which is mounted a carriage or housing 5 supporting the burr removing mechanism and the work gear support with the bolster or bracket 4 extending in the rear of the carriage 3 for the chamfering tool mechanism, the work gear support overhanging the carriage 3, in order that the chamfer cutters may coact with the work gear support mounted in the carriage 5 while the chamfering tools are in operation. The base 1 houses the drive shaft and some of the motion transmitting mechanism actuated thereby for actuating the chamfering tools and the burr cutters, which mechanism will be hereinafter described.

The carriage 3 comprises a lower section 6 (Figure 1) and upper sections 7, the upper sections being cross adjustable carriages which carry respectively duplicate tool mechanisms and are adjustable individually on the section 6 to separate them different distances in a radial direction relative to their axes, for work gears of different axial widths. The carriage 3 with the parts carried thereby is adjustable about an upright axis and also vertically, relatively to the base 1, in order to vary the angle of the chamfering tools relatively to the gear teeth of the work gear and to position the chamfer cutter for gears of different diameters. The axes of the chamfering tool holders extend in a generally radial direction relative to the upright axis of the carriage 3 or in lines parallel to a plane diametrical with said axis midway between the holders. The purpose of the cross adjustment is to locate the chamfer cutter to coact with gears of various diameters.

The lower section 6, which houses the drive mechanism for the spindles which carry the chamfering tools, is here shown as formed with a hollow stem (Figure 2) which fits into a vertical tubular bearing 10 in the base 1. A shaft 11 extends through the stem 9 and is connected at its lower end to the drive shaft, to be hereinafter described, and at its upper end to a shaft, which, through motion transmitting mechanism, drives the spindles for the chamfering tools. Shifting of the carriage 3 about its upright axis, varies the radial angle of the chamfering tool holders for various angles of spiral teeth. The carriage 3 and all parts carried thereby is adjustable vertically to vary the height of the chamfering tools in any suitable manner, as by jacks or screws 12, which thrust against the lower side of the carriage 3. Obviously, by turning the screws or jacks 12 in one direction or the other, the entire carriage will be elevated or lowered.

13 and 14 designate opposing cutters for chamfering opposite ends of the teeth of a work gear G (Figure 4), these being carried in suitable heads 15, 16, removably mounted on the ends of spindles 18 jornalled respectively in the upper sections 7 of the carriage 3, these being mounted with their axes in substantially the same horizontal plane but with their axes spaced apart or out of alinement a sufficient distance for the cutters 13, 14 to chamfer opposite ends of the spiral gear teeth.

As best seen in Figure 10, the upper sections or cross adjustable carriages 7 are secured to the lower or main section 6 through transverse ways, as T slots 19, formed in the lower section 6 (Figure 10) and complemental projections on the upper sections 7 slidable in the ways 19. The sections 7 are held in their position by nuts 21 threading on studs 22 projecting from the lower section 6, and also by nuts 21ª threading on studs 22ª on the T shaped projections which interlock in the T shaped ways or slots 19. The studs 22 and 22ª extend through slots in the carriages 7 and the nuts 21, 21ª clamp against the carriages 7. By loosening the nuts 21, 21ª, the upper sections 7 may be shifted by hand to vary the radial distance between their axes in a horizontal plane, in order that the cutters may be adjusted to chamfer teeth of different widths in an axial direction. The cross adjustable carriages are further guided in their adjusting movement by keys K fitting channels 19ª formed partly in the upper face of the section 6 and in the lower faces of the carriages 7. The T slots 19 are enlargements of the portions of the channels 19ª in the section or carriage 6. The cutter heads 15, 16 are mounted in the ends of spindles 18 and are interlocked with the ends of the spindles by means of fine teeth at 23. Each cutter head is held or clamped in position with the fine teeth 23 engaged, by means of a screw bolt 24 extending axially of the spindle 18 and threading into the cutter head. By unscrewing the screw bolt 24, the head 15 or 16 can be loosened to disengage the teeth and turned to adjust the angle of the cutter 13 or 14 to any desired position. A fine adjustment is effected by adjusting screw S operable in any suitable manner. This adjustment forms no part of this invention.

A hand wheel 25 is mounted on the outer end of each spindle 18 for turning the cutter when the machine is idle, the hand wheel serving to manipulate and initially locate the cutter.

Each spindle 18 is suitably mounted in the section or cross adjustable carriage 7 in any suitable manner. It is actuated to turn the cutter heads 15, 16 from the shaft 11 through shaft 26 suitably journalled in the lower section 6, and shafts 28 and 29 connected at like ends through beveled gears 30 and 31 to the ends of the shaft 26 and to the spindle 24 through gears 32, 32ª, between the shafts 28 and 29 and the spindles 18 respectively. The shaft 26 is connected to the shaft 11 through suitable gearing 33, 33ª.

In order to adjust the axes of the spindles 18 and the cutters into different inclinations for chamfering gear teeth of various angles, the section 6 may be turned about the shaft 11 to carry the spindles 18 into different radial positions. The hollow stem 9 turns in the hub 10 during this movement and is held in its adjusted position in any suitable manner, as by clamping screws 35 extending through lugs on the hub 10, which is split longitudinally, and when tightened, by tightening the screws clamped on the stem 9 and holds it in its adjusted position.

The carriage or housing 5 is mounted on the bracket 4 and encloses the burr cutter mechanism and the work gear holding mechanism.

The work gear holder comprises a hollow spindle or shaft 40 journalled in a suitable bearing in the housing 5, this being actuated from the drive mechanism within the base 1, and as here shown (Figure 3) it is provided with a gear, as a worm gear 41, connected to a shaft 42 through suitable gearing in a housing 43, the shaft 42 being splined in, or slidable axially of, the shaft 44 extending into the base 1 where it is connected to the drive mechanism to be hereinafter described.

45 (Figure 4) is a support for the work gear G, this being an expanding chuck carried by the spindle 40 in axial alinement therewith and here shown as threading at 46 into the hollow spindle 40 and as having a collar 47 abutting against the end of the hollow spindle 40. The work holder 45 is designed to extend into the bore B of the gear G and to be expanded to firmly grip and hold the gear G. It is operated by an expander, as a wedge or conical shaped head 48 fitting a complemental bore in the end of the holder 45 and shiftable axially by a stem 49 extending axially through the work holder 45 and connected by a coupling 50 and rod 51 to a piston movable in the air cylinder 52. When the air is let into one end of the cylinder 52, the rod 49 is drawn to the right (Figure 4) and the holder 45 expanded into snug engagement with the wall of the bore B of the work gear G. When the air is let into the opposite end of the cylinder, the rod 49 is moved to the left (Figure 4) releasing the holder 45 so that it may contract and the gear G removed and a new one replaced.

The means for controlling the air to and from the cylinder will be presently described.

53 is the burr cutter support or shaft, this being a hollow shaft rotatably mounted on a spindle or stud 54 fitting in a bushing 55, which in turn is mounted in a hub or boss 56 on the housing 5. The spindle 54 has a collar 57 thereon abutting against the inner end of the bushing 55 and the hub 56, and a nut 58 threads on the outer end of the stud against an annular flange 59, which flange abuts against the outer face of the hub 56, all for the purpose of rigidly and snugly holding the stud 54 in position. The hollow shaft or burr cutter support 53 is connected to the spindle 40 to rotate simultaneously or synchronously therewith through intermeshing gears 60 and 61 mounted on the hollow shaft 53 and the spindle 40 respectively. The gear 61 is keyed to the spindle 40 and is held thereon by a nut or collar 62 threading on the inner end of the spindle 40. The gear 60 is similarly keyed to the hollow shaft 53 and is held in position by a threaded collar or nut 63.

65 (Figure 4) designates a burr cutter for removing the burrs that may be left on the gear teeth after the chamfering operation, this being secured, as by screws 67, to one end of a cutter head 68 (Figure 4) rotatable with or keyed to the hollow support or shaft 53 and also mounted to slide axially thereof. The cutter head 68 is spring-pressed to press the cutter 66 against the side face of the work gear G, this being one of the features of the burr cutting mechanism.

As here illustrated, the burr cutter head 68 is pressed axially by springs, as 69, encircling plungers mounted in bores in the head parallel to the axis of the head and opening through the face of the head toward the gear 60, the plungers having heads 70 which thrust against the gear 60 and the springs being located in the bores and thrusting at like ends against the heads 70 and at their other ends against the bottoms of the bores or shoulders within the bores. Preferably, a guide or locating gear 73 is mounted on the hollow shaft 53 in position to mesh with the work gear G. This is removably held in position by means of a nut or collar 74 threading on the hollow shaft 53. It is obvious that during the chamfering operation by the cutters 13, 14, the work gear G is being turned or rotated by the spindle 40 and at the same time a burr removing operation is being performed by the burr cutters 65 mounted on the shaft 53, which is rotatable in synchronism with the shaft 40 through the gears 60 and 61. The guide gear, when once set for a gear of given size, accurately locates each new work gear relative to the chamfering cutter.

A nut 54<sup>b</sup> threads on the end of the stud or spindle 54 and thrusts against the end of the hollow burr cutter support 53, through a washer 54<sup>c</sup> to hold the support or shaft from axial displacement off the stud or spindle 54.

Means is provided for automatically withdrawing the burr cutter 65 away from the work gear G at the end of each work cycle, in order to facilitate the removal of the work gear and replacing of a new one thereon, and as here shown, this withdrawing operation is performed at the end of the burr cutting and chamfering cycle, by means of a pin or projection 77 on the burr cutter head 68 coacting with a stationary cam part 78 (see Figures 4, 5 and 6), the cam 78 being arranged to coact with the pin 77 when the burr cutter has made a complete revolution. After a new gear G has been placed in position, and the machine again started, the pin or projection 77 clears the cam 78 and the springs 69 are free to react to press the burr cutter 65 against the new work gear. The withdrawing of the burr cutter relieves the operator of pushing it back against the spring resistance, when loading a new work gear on the work support.

In some gears, it is desirable to remove the burrs only from one end or the other of the gear teeth, and in others, from both ends. In Figure 4, a cutter for removing the burrs from one end of the gear teeth is shown. For removing the burrs from the other end only, the burr cutter 65 is merely located on the opposite side from that seen in Figure 4 together with the hollow shaft 53, stud 54, etc., in the event the gear is of such shape or so located in a cluster that the gear can not be reversed on the support 45.

In Figure 7, a construction is shown in which a pair of cutters are provided for removing the burrs on opposite ends of the gear teeth at the same time.

In Figure 7, 66<sup>a</sup> and 66<sup>b</sup> designate cutters respectively; 68<sup>a</sup> and 68<sup>b</sup> cutter heads mounted on the hollow support or shaft 53<sup>a</sup>, which in turn is mounted upon the stud 54<sup>a</sup>. The guide gear 73<sup>a</sup> is mounted between the burr cutters 66<sup>a</sup> and 66<sup>b</sup>. Both burr cutter heads 68<sup>a</sup> and 68<sup>b</sup> are spring-pressed, as in Figure 5, but the plunger heads 70<sup>b</sup> associated with the cutter head 66<sup>b</sup> thrust against a nut 79 threading on the outer end of the support or hollow shaft 53<sup>a</sup>.

In the form shown in Figure 7, in order to remove and replace the work gear G', relative separating movement of the work gear support 45 and the burr cutter support 53<sup>a</sup> is necessary, and therefore, one of these parts is shiftable in a generally radial direction toward and from the other.

In the construction shown in Figure 7, the burr cutter support 53<sup>a</sup> is shiftable radially relatively to the support 45 for the work gear G'. In order to accomplish this radial movement, the stud 54<sup>a</sup> is mounted in a carriage 80 slidable along vertical guide ways 81 extending upwardly from the carriage 5<sup>a</sup> in which the spindle 40 is mounted. The vertical movement of the carriage 80 may be accomplished in any suitable manner, and as here shown, is effected by means of a piston mounted in an air cylinder 82 having its rod 83 connected through suitable motion transmitting mechanism to the carriage 80. This mechanism is shown as a lever 84 pivoted between its ends at 85 to the carriage 5<sup>a</sup>, the piston rod 83 being connected to one end of the lever and the other end of the lever being pivotally connected, as by a pin-and-slot connection at 86 to the carriage 80. As air is admitted to one end of the cylinder 82, the movement of the piston and piston rod therein downwardly, the end of the lever 84, which is connected to the carriage 80, will be moved upwardly and thus separate the burr cutters 66<sup>a</sup> and 66<sup>b</sup> from the work gear G' and also separate the guide gears 73ª from the work gear G', so that the work gear may be removed and a new one placed in position. Exhaust of air from the cylinder and admission of air to the lower end of the cylinder 82 will cause the carriage 80 to move vertically, carrying the burr cutters in operative relation to the gear teeth and bring the guide gear 73ª into mesh with the work gear G'.

The burr cutter heads 68ª and 68ᵇ need not be provided with cam means similar to the cams 77, 78 (Figure 4), as these burr cutters may be formed with flared rim portions 87 which will engage the ends of the gear teeth of the work gear, when the carriage 80 is moved downwardly, and cause the burr cutters 66ª and 66ᵇ to separate, as their cutting faces ride up onto the end faces of the gear teeth. Usually the work gears have been chamfered as at C (Figure 7) at the junction of their top and end faces before the chamfering operation is performed in this machine, and such chamfering at C facilitates the separation of the burr cutters 66ª, 66ᵇ, when the carriage 80 is moved downwardly to bring the burr cutters into juxtaposition to the end faces of the work gear G'.

Automatic means is provided for stopping the machine at the end of each work cycle or when the chamfering and burr removing operations on the work gear have been completed, or when the work gear has made a complete revolution, and hence all teeth have been chamfered and burrs removed. In the illustrated embodiment of my invention, this automatic means is operated by one of the shafts 40 or 53, and it is here shown as operated by the burr cutter support or shaft 53, and consists of a pin 90 (see Figures 1, 4 and 5) here shown as projecting beyond one side of the gear 60, and arranged to coact at the end of each cycle with a knock-off pin, here shown as a sliding knock-off pin 91, coacting with a latch 92 (Figure 1) pivoted to the frame at 93 and normally holding an operating member or lever 94 in its operated position or its position assumed when the machine is running. The operating lever 94 is held latched against the action of a returning spring 95. As shown, the spring encircles a link 96 pivoted at one end to the lever and having its other end provided with a head 96ª slidable in a tube 96ᵇ pivoted at 96ᶜ to the housing 5. The spring is compressed between the head 96ª and an internal shoulder 96ᵈ on the tube. The operating lever is connected through motion transmitting means to a control member or valve operating member 97 for the actuating mechanism. As seen in Figure 4, these connections comprise links 97ª, 97ᵇ arranged at an angle to each other, the links being pivoted together at 97ᶜ, and the link 97ª being pivoted to an arm 94ª of the lever 94 and the link 97ᵇ to the upper end of a lug 98 on the carriage 5. The link 97ᵇ has rollers 97ᵉ and 97ᶠ on opposite sides of the pivotal point on the lug, for coacting with arms of the valve operating member 97. Movement of the link 97ª upward operates the rocking valve operating member 97 in one direction into the position shown in Figure 4, and movement of the link 97ª downward rocks the member in the opposite direction. The member 97 operates a valve 97ʰ, which controls the flow of air to and from the cylinder, effecting the starting and stopping of the drive mechanism in the base 1. The valve mechanism per se forms no part of this invention. In so far as the invention is concerned, it is sufficient to bear in mind that movement of the lever 94, when unlatched, effects the stopping of the machine, and when moved to its latched position, effects the starting of the machine.

When the work cycle period is completed, the pin 90 comes into engagement with the sliding knock-off pin 91 and trips the latch 92, permitting the lever to move from its latched position to which it has been moved by hand and operate the control member 97 to effect the stopping of the machine.

Upon operating the lever 94 by hand to its latched position, the control member is operated to start the machine and in the initial rotation of the shaft 53, the pin 90 clears the knock-off pin 91, so that the machine goes through another cycle. The latch 92 is pressed into operative position by a spring 99.

In the construction shown in Figure 7, in order that the burr cutter spindle may come back into the position in which it has been automatically stopped, when the burr cutter carriage is moved radially back into its normal position, so that the timing of the cam 90 relative to the knock-off pin will not be upset, means for locating the burr cutter spindle is provided, this means being here shown in Figures 7 and 8, as consisting of a pin 60ᵇ on the gear 60ª and a guide member 60ᶜ on the gear meshing therewith, the guide member being a radial arm provided with a slot 60ᵈ opening through the end thereof for receiving the pin, when the burr cutter carriage is moved downwardly into operative position. In the event, there has been some shifting of the burr cutter carriage or the work gear carriage about its axis, the pin, when it enters the slot, will accurately locate the two gears in their original position, so that the timing of the cam 90 and knock-off pin is maintained.

The driving mechanism will now be described. Referring to Figure 2, 100 designates a drive shaft which may be connected in any suitable manner to a prime mover, it being here shown as provided with a pulley 101 for connection to a motor. The drive shaft is located and suitably mounted in the lower part of the base 1. 102 is a driven shaft mounted in axial alinement with the drive shaft and connected thereto through a clutch 103. The clutch may be of any suitable construction and includes an axially shiftable member operable to disengage the clutch by a throw-out collar 104. The drive shaft 100 and driven shaft 102 extend horizontally and the driven shaft is connected to the vertical shaft 11 through beveled gears 105, 106. The shaft 11 through the gears 33, 33ª actuates the shaft 26, which in turn actuates the shafts or spindles 18 on which the heads 15, 16 carrying the chamfering cutters are carried. The shaft 11 is slidably mounted in the elongated hub 107 of the beveled gear 106 in order to permit the vertical adjustment of the carriage 3 by the jack screws 12.

The driven shaft 102 is also connected, as by beveled gears 108, 109 to the lower end of the shaft 44, which has a sliding or telescoping connection with the shaft 42 and which through gears in the housing 43, actuates the hollow shaft 40 carrying the work gear holder 45.

A brake member 110 is shiftable axially of the driven shaft 102 and arranged to engage a stationary brake surface 111 when the clutch 103 is disengaged, and thus stop the machine from coasting too far under momentum or accurately stopping the machine when the clutch is disengaged. This brake stops the machine at the end of each work cycle period or when the cam 78 has retracted the burr cutter 66 and the pin 90 trips the latch 92. The clutch 103 is operated by an air cylinder 112 having a piston therein, the rod 113 of which is connected to a lever, as a bell crank lever 114, pivoted at 115 and having one arm thereof coacting with the throw-out collar 104. The piston rod 113 is also pivotally connected by a lost motion connection to one end of a push link 116, the other end of which is pivoted to a vertically movable rod 117, which through one arm 118 of the bell crank pivoted at 119 actuates the brake member 110, the other arm 120 of the bell crank constituting a shifting yoke for the member 110. The movement of the rod 117 is against the action of a returning spring 121. The lost motion permitted by the slot 122 in the link 116 permits sufficient movement of the piston 113 to disengage the clutch before the brake member 110 engages the brake member 111. The flow of air to the cylinder 112 is controlled by the control member or valve 97h. This control valve may be of any suitable construction, and when operated by the lever 94, when the latch 92 trips, permits air to enter from a suitable source of supply through intake pipe 123 and through an outlet pipe 124 to the cylinder 112 to disengage the clutch, and when the lever 94 is operated to its other position, permits air to exhaust from the upper end of the cylinder 112 and to enter the lower end to actuate the lever 114 to engage the clutch and the rod 117 and lever 118 to disengage the brake.

The expander 48 is operated by a piston in the cylinder 52 and the flow of air to and from the cylinder may be controlled by the control member 97, but it is preferable to control the flow of air to the cylinder 52, and hence, the operation of the expander or chuck 48 by a separate control operable after the machine is stopped. As here shown, the flow of air to and from the cylinder 52 is controlled by a control member or valve 125 (Figure 1) having an operating member or lever 126. When the lever 126 is in one position, it operates the valve within the valve casing 125 to permit air to flow into the cylinder 52 to move the expander 48 and its rod 49 to the left and expand the work holder 45 into snug engagement with the work gear G, and hence firmly hold the work gear. When operated into another position, it acts to move the expander to the left and releases the holder 45 to permit the gear G to be removed and a new one replaced.

The valve casing 125 is connected in any suitable manner to a source of air or motive fluid supply, as to a pipe 127 and through pipes 128, 129 to opposite ends of the cylinder 52. The construction of the valve mechanisms of this machine forms no part of this invention and they are standard articles, which may be purchased in the open market and any suitable valve mechanism may be employed.

The bell crank or throw-out lever 114 (Figure 2) is connected to a lever 130 by a link 131. The lever 130 operates the impeller or pump of a lubricating system extending to all movable parts of the machine, so that every time a machine is stopped, a shot of oil is given to each movable part of the machine. This lubricating system forms no part of the invention.

In operation, the proper size guide gear 73 and burr cutter 65 is mounted on the burr cutter shaft or spindle 53 for the gears of the particular batch to be chamfered and burred. The carriage 6 is adjusted to the proper height by the jack screws 12 for the work gear and the carriage 6 adjusted about its axis for the incline of the spiral gear teeth of the work gear, and also the sections or cross adjustable carriages 7 adjusted crosswise for the axial width of the work gear. In placing the work gear in mesh with the guide gear 73, it may be necessary to use some manipulation or turning of the work gear to get the teeth thereof into mesh with the guide gear 73 before the spindle or chuck 48 is tightened. The handle 126 is then operated to let air into the cylinder, the piston of which operates the expander 48 to tighten the work gear into position. The handle 94 is then operated in its position shown in Figure 3 into engagement with the latch 92. This operation lets the air into the cylinder 112 to operate the piston rod 113 to release the brake member 110 and throw in the clutch 103 connecting the drive shafts 100 and 102 together, so that the chamfering tools and the burr cutter tool are operated and the chamfering and burring operations take place at the same time. When these operations are completed and they are completed upon one rotation of the shaft 53 carrying the burr cutter 65, the cam pin 90 comes into engagement with the knock-off pin 91, trips the latch 92, releases the lever 94, so that the machine is stopped, as before described.

In the form shown in Figure 7 in which the burr carriage for the burr cutter is moved radially, the tripping of the latch 92 also lets air into the cylinder 82 to move the burr cutter carriage or shaft 53ª radially away from the work gear, so that the work gear can be removed and a new one replaced, while the burr cutters and guide gear are separated from the work gear. When the lever 94 is operated manually, it also through the control valve 97h lets air into the cylinder 82 to quickly move the work cutter carriage 53ª radially back into its normal position. The burr cutters 66ª, 66ᵇ engage the opposite ends of the gear teeth. If there has been any slight mislocation of the gear G' on the burr cutter shaft 53ª relative to the gear 73ª on the work gear spindle, this mislocation is corrected by the pin 60ᵈ coming into the slot of the locating arm 60ᶜ.

What I claim is:

1. In a gear tooth finishing machine, the combination of a rotatable support for a work gear, a rotatable support for opposing spaced apart burr cutters for coacting with opposite ends of the gear teeth of the work gear, a gear mounted on the burr cutter support between the burr cutters and meshing with the work gear, and means for rotating the supports simultaneously.

2. In a gear tooth finishing machine, the combination of a rotatable support for a work gear, a rotatable support for a tool for chamfering the ends of the gear teeth, a rotatable support for a burr cutter for coacting with the ends of the gear teeth after being chamfered, a guide gear mounted on the burr cutter support and rotatable therewith and meshing with the work gear, and mechanism for rotating said rotatable supports, whereby the gear teeth are chamfered and the burrs removed in one work cycle period.

3. In a gear tooth finishing machine, the combination of a rotatable support for a work gear, a rotatable support for opposing spaced apart burr cutters for coacting with opposite ends of the gear teeth, a gear mounted on the burr cutter support between the burr cutters and meshing with the work gear, means for rotating the supports simultaneously, one of said supports being shiftable in a radial direction toward and from the other for effecting relative movement of the support for the work gear, and the support for the burr cutters toward and from the other for effecting separation and bringing together of the work gear and the burr cutters, and the gear on the burr cutter support.

4. In a gear tooth chamfering and finishing machine, the combination of a rotatable support for a work gear, rotatable supports for tools for chamfering the opposite ends of the gear teeth, a rotatable support for burr cutter means for coacting with the ends of the gear teeth after being chamfered, mechanism for rotating said rotatable supports synchronously, and means for effecting, in a direction radial to the work gear support, relative shifting movement of the support for the burr cutter means and the support for the work gear for shifting one support toward and from the other to permit the loading and unloading of the work gear from its support, and a guide gear mounted as a unit with, and rotatable with, the burr cutter support and meshing with the work gear.

5. In a gear tooth finishing machine, the combination of a rotatable support for a work gear, a rotatable support for a burr cutter for coacting with the end faces of the gear teeth, mechanism for rotating the rotatable supports synchronously, a member controlling the operation of said mechanism and having an "on" and "off" position, and timed means operable by one of said rotatable supports for operating said member into position to stop said mechanism including latch means normally holding said member in "on" position, a knock-off cam coacting with the latter and rotatable with said supports and movable with the knock-off to operate it and trip the latch.

EARL R. FISH.